United States Patent [19]

Bishai

[11] 4,225,799
[45] Sep. 30, 1980

[54] FIELD MAGNET ASSEMBLY

[75] Inventor: Macram N. Bishai, Flint, Mich.

[73] Assignee: General Motors Corporation, Detroit, Mich.

[21] Appl. No.: 56,774

[22] Filed: Jul. 11, 1979

[51] Int. Cl.³ .......................................... H02K 21/28
[52] U.S. Cl. .................................................. 310/154
[58] Field of Search .............. 310/40 R, 40 MM, 154, 310/155, 254

[56] References Cited

U.S. PATENT DOCUMENTS

| 3,091,713 | 5/1963 | Latta | 310/154 |
| 3,182,215 | 5/1965 | Du Bois et al. | 310/154 |
| 3,631,277 | 12/1971 | Ferdig et al. | 310/154 |
| 3,790,830 | 2/1974 | Bonfiglio | 310/154 X |

FOREIGN PATENT DOCUMENTS 2005194 8/1971 Fed. Rep. of Germany .... 310/40 MM

Primary Examiner—Mark O. Budd
Attorney, Agent, or Firm—Donald F. Scherer

[57] ABSTRACT

A magnet assembly for a permanent magnet direct current electric motor has two arcuate members positioned in a cylindrical frame by a pair of spring clips which maintain the position of the arcuate member within the frame prior to magnetization of the arcuate members. Each spring clip has circumferentially extending primary spring arms, radially extending secondary spring arms and an arcuate base portion to which the secondary spring arms are integral with. The primary spring arms bear against radial side faces of the arcuate members and the arcuate base portion is substantially aligned with the inner surface of the arcuate members. The spring arms provide a range of deflection which permits a wider tolerance on the arcuate members.

4 Claims, 6 Drawing Figures

FIELD MAGNET ASSEMBLY

This invention relates to field magnet assemblies and more particularly to field magnet assemblies having arcuate members positioned by spring clips.

The use of permanent magnets made from ceramic materials is well-known in the art of direct current electric motors. These magnets may be either cylindrical or arcuate and when arcuate shapes are utilized, a mechanical structure is employed to maintain the arcuate segments separate and positioned within a cylindrical frame or housing of magnetic material prior to magnetization of the arcuate members.

The arcuate member typically has an arc measurement of 130° plus or minus 8° which means that in a system utilizing two arcuate members there is a total tolerance of 16° or 8° per side. With prior art spring clips, it is necessary to provide some selective assembly of the arcuate members to reduce the total tolerances to a range which can be efectively handled by a conventional spring clip. An alternative to selective assembly is precision machining of the arcuate members to provide a more closely controlled tolerance. In either event, a production cost is incurred.

The present invention, through the use of primary and secondary spring arms, permits a spring clip to have a wide range of acceptable deflection without a resulting overstressing of the spring. A primary or circumferentially extending spring arm provides a substantially circumferential deflection, and a radially extending spring arm provides extended circumferential deflection when the stress and the primary spring arm reaches a predetermined value which is less than the yield point for the material.

A secondary but equally unique feature of the present invention permits the use of this spring clip and magnet assembly in a pump motor assembly such as that shown in United States Ser. No. 938,947, filed Sept. 1, 1978, and assigned to the assignee of this application. When utilized in such pump motor structures, the spring clip cooperates with the cylindrical housing which surrounds the arcuate members to provide a fluid flow path longitudinally to the arcuate members and separated from the rotating armature of the motor. It will be appreciated by those skilled in the art that such a flow path structure will reduce the fluid turbulence within the system thereby increasing the efficiency of such pump motor structures.

It is an object of this invention to provide an improved field magnet assembly for a DC electric motor wherein spring clips for positioning arcuate members in a cylindrical housing prior to magnetization have primary and secondary spring arms.

It is another object of this invention to provide an improved field magnet assembly for a DC electric motor wherein spring clips for positioning arcuate members in a cylindrical housing prior to magnetization have primary and secondary spring arms, and an arcuate base portion substantially circumferentially aligned with the inner circumference of the arcuate members and cooperating therewith to form diametrically opposed arcuate surfaces intermediate the side walls of adjacent arcuate members.

These and other objects and advantages of the present invention will be more apparent from the following description and drawings in which.

Figure 1:
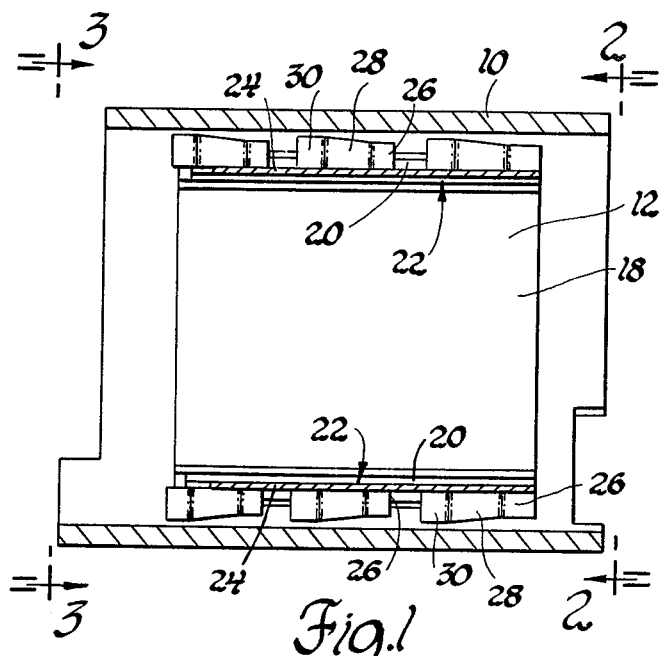
FIG. 1 is a cross-sectional view of a magnet assembly incorporating spring clips.

Referring to the drawings, wherein like characters represent the same or corresponding parts throughout the several views, there is seen a cylindrical frame or housing member 10 which is made of a magnetic material, preferably steel. Disposed within the frame 10 are diametrically opposed arcuate members 12 and 14 which are made preferably from a rare earth or other magnetizable material. Each arcuate member has an outer arcuate circumference 16 which conforms to the inner circumference of the frame 10; an inner arcuate circumference 18 and a pair of sidewalls 20. The arcuate members 12 and 14 are separated and urged outwardly by a pair of spring clips 22 which are identical in structure and diametrically opposed in location.

Figure 4:
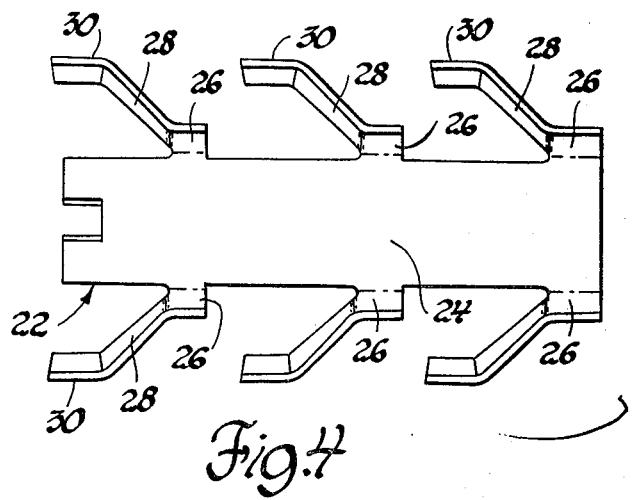
FIG. 4 is a top view of a spring clip.
Figure 5:
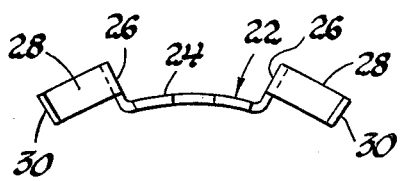
FIG. 5 is an end view of the spring clip shown in FIG. 4.
Figure 6:
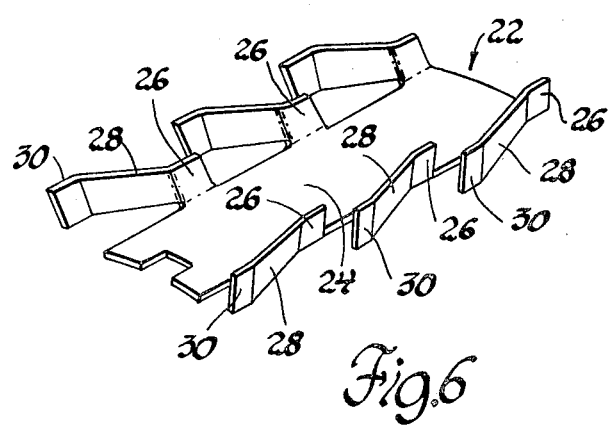
FIG. 6 is a perspective view of the spring clip.

As best seen in FIGS. 4, 5 and 6, each spring clip 22 has an arcuate base portion 24 from which extends a plurality of radial arms 26. Each radial arm has extending integrally therefrom a circumferential arm 28 which terminates in a substantially flat axially oriented face 30. The face 30 abuts the sidewall 20 of the arcuate members 12 and 14 and depending upon the arcuate dimension, the arms 28, functioning as primary springs, deflect circumferentially as required. If the deflection of arms 28 results in a high stress, the arms 26, functioning as secondary springs, will deflect inwardly thereby accommodating a wide tolerance angle on the arcuate members 12 and 14.

Figure 2:
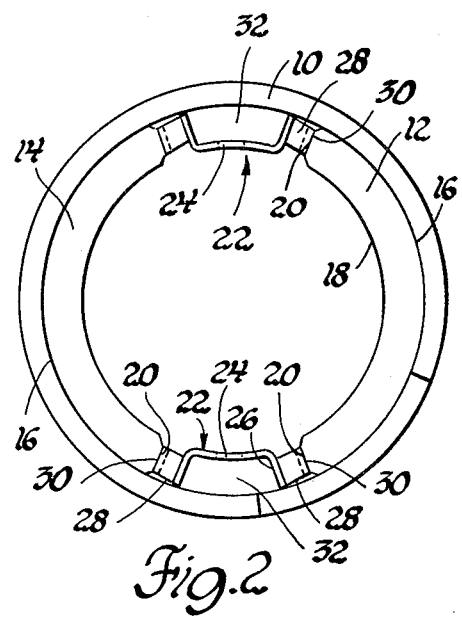
FIG. 2 is a view taken along line 2—2 of FIG. 1.
Figure 3:
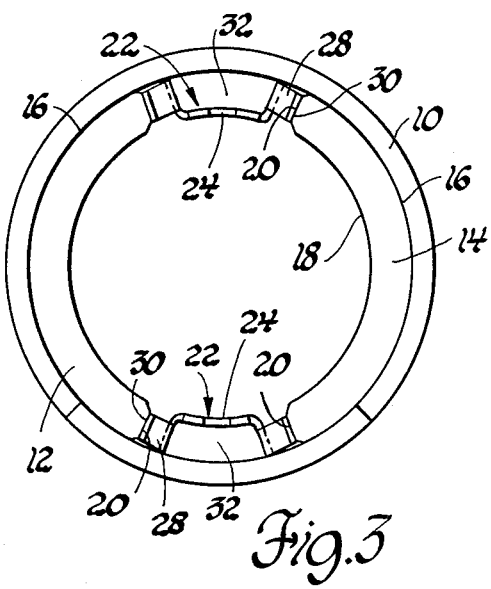
FIG. 3 is a view taken along line 3—3 of FIG. 1.

As can be seen in FIGS. 2 and 3, an arcuate space 32 is formed by arcuate base portion 24, the outer circumference 16 and the sidewalls 20 or arms 26 and 28. This arcuate space 32 becomes particularly important when the field magneti assembly is utilized in a pump motor structure such as that shown in the above-mentioned United States Ser. No. 938,947. Upon a review of this patent application, it will be noticed that fluid flow from the pump passes through the arcuate space intermediate the magnets and external to the motor armature. By using the arcuate space 32, the fluid is separated from the rotating armature of the motor by the arcuate base portion 24, thus reducing turbulence within the fluid, which, as is well-known, will improve the efficiency. However, the structure offers an advantage in all electric motor structures which utilize this field magnet assembly in that the spring clips 22 will accept arcuate magnets having a wider tolerance than presently permissible within such magnet assembly structures.

Many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A field magnet assembly for a permanent magnet electric motor comprising, a cylindrical frame of magnetic material, a plurality of radially magnetized arcuate magnets having outer cylindrical surfaces mating with and seated against the inner circumferential surface of said cylindrical frame, each magnet having circumferentially spaced substantially planar sidewalls, and a spring clip disposed in said frame between the sidewalls of adjacent magnets, each spring clip having an arcuate base portion substantially coextensive with the inner circumferential surface of each magnet so as to define therewith a cylindrical envelope for receiving an armature and a plurality of spring arms extending from opposite sides of said base portion, each spring arm having a radially oriented portion adjacent the base portion and an integral circumferentially extending portion terminating in an axially oriented face abutting the sidewall of one of said magnets, the circumferentially extending portion and the radially oriented portion of each spring arm being sequentially deflectable to retain the magnets in assembled relation with the frame.

2. A field magnet assembly for a permanent magnet electric motor comprising: a tubular frame of magnetic material; a pair of segmented arcuate magnet elements having outer cylindrical faces mating with and seated against the inner face of the tubular frame, each element having circumferentially spaced substantially planar axially extending radial side walls; spring clips disposed in said tubular frame within the cylindrical envelope defined by the magnets and seated against said face defining sidewalls on adjacent annular segmented elements, each spring clip having a base portion forming a segment of a cylinder, a plurality of primary spring arms extending circumferentially relative to said tubular frame, and radially extending secondary spring arms formed integrally between the base portion and the primary spring arms; said primary spring arms being disposed in abutting relationship with facing radial sidewalls on adjacent segmented elements and being deflectable in the circumferential direction an amount sufficient to establish a positioning force on adjacent segmented elements, and said secondary spring arms deflecting to accommodate the spacing between adjacent segmented elements if the primary spring arms are deflected in the circumferential direction greater than a predetermined amount.

3. An improvement in permanent magnet motors having segmented annular magnets circumferentially mounted in a cylindrical housing and separated by spring clips, wherein the improvement comprises: a spring clip having circumferentially extending primary spring arms and radially extending secondary spring arms which are integrally formed interconnecting the main body of the clip and the primary spring arms; said primary spring arms being deflectable in the circumferential direction an amount sufficient to establish a positioning force on adjacent magnet segments, and said secondary spring arms deflecting to accommodate the spacing between adjacent magnet segments if the primary spring arms are deflected in the circumferential direction greater than a predetermined amount.

4. A field magnet assembly for a permanent magnet electric motor comprising: a tubular frame; a pair of segmented annular magnets mounted adjacent the inner circumference of said tubular frame, each magnet having a pair of axially extending radial sidewalls; a pair of spring clips disposed in said tubular frame in diametrically opposed locations intermediate said segmented annular magnets, each spring clip having a base portion, a plurality of primary spring arms extending circumferentially relative to said tubular frame, and a plurality of radially extending secondary spring arms formed integrally between the base portion and respective primary spring arms; said primary spring arms being disposed in abutting relationship with adjacent radial sidewalls and being deflectable in the circumferential direction an amount sufficient to establish a positioning force on adjacent magnet segments, and said secondary spring arms deflecting to accommodate the spacing between adjacent magnet segments if the primary spring arms are deflected in a circumferential direction greater than a predetermined amount.

* * * * *